(12) United States Patent
Mori

(10) Patent No.: US 8,488,182 B2
(45) Date of Patent: Jul. 16, 2013

(54) SCANNER DRIVER FOR AN INFORMATION PROCESSING APPARATUS AND COPY SYSTEM

(75) Inventor: Hiromi Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 352 days.

(21) Appl. No.: 12/805,410

(22) Filed: Jul. 29, 2010

(65) Prior Publication Data

US 2010/0302559 A1     Dec. 2, 2010

Related U.S. Application Data

(63) Continuation of application No. 10/973,355, filed on Oct. 27, 2004.

(30) Foreign Application Priority Data

Nov. 4, 2003 (JP) ................................. 2003-373990

(51) Int. Cl.
  *G06K 15/00* (2006.01)
  *G06K 1/00* (2006.01)
  *G06F 15/00* (2006.01)

(52) U.S. Cl.
  USPC .............................. 358/1.18; 358/1.2; 358/1.3

(58) Field of Classification Search
  None
  See application file for complete search history.

(56) References Cited

U.S. PATENT DOCUMENTS

| | | | | |
|---|---|---|---|---|
| 5,349,422 A | * | 9/1994 | Ohashi | 399/86 |
| 5,428,459 A | * | 6/1995 | Asai | 358/449 |
| 5,680,204 A | | 10/1997 | Ferrara | |
| 2001/0035983 A1 | * | 11/2001 | Abe | 358/468 |
| 2002/0036799 A1 | * | 3/2002 | Sumiyama et al. | 358/1.15 |
| 2002/0044298 A1 | | 4/2002 | Kaneko et al. | |
| 2002/0051204 A1 | * | 5/2002 | Ohara | 358/1.16 |
| 2003/0039482 A1 | * | 2/2003 | Kishi et al. | 399/81 |
| 2003/0086720 A1 | * | 5/2003 | Song | 399/81 |
| 2003/0098990 A1 | | 5/2003 | Nakamura | |
| 2003/0103236 A1 | * | 6/2003 | Kato | 358/1.15 |

FOREIGN PATENT DOCUMENTS

| | | |
|---|---|---|
| JP | A-9-23332 | 1/1997 |
| JP | A-2000-92282 | 3/2000 |
| JP | A-2000-184176 | 6/2000 |
| JP | A-2001-345974 | 12/2001 |

OTHER PUBLICATIONS

English Language version of Japanese Patent Office Notification of Reason for Refusal dated Nov. 9, 2007.

* cited by examiner

*Primary Examiner* — Ming Hon
(74) *Attorney, Agent, or Firm* — Oliff & Berridge, PLC

(57) ABSTRACT

The information processing apparatus, which transmits/receives information to/from a scanner and a printer, is operated by an application program for instructing the printer to print an image read by the scanner in alignment with at least one end of a printable range belonging to a print paper size to be printed. A scanner driver program allows the apparatus to implement: a determination function of determining a readable range of a read paper size to be read by the scanner; an acquisition function of executing a printer driver program for the printer to acquire a printable range belonging to a print paper size as large as the read paper size; and a control function of making control to print an image within an overlapping range between the readable range and the printable range according to an instruction of the instruction function when the determined readable range includes the acquired printable range.

12 Claims, 10 Drawing Sheets

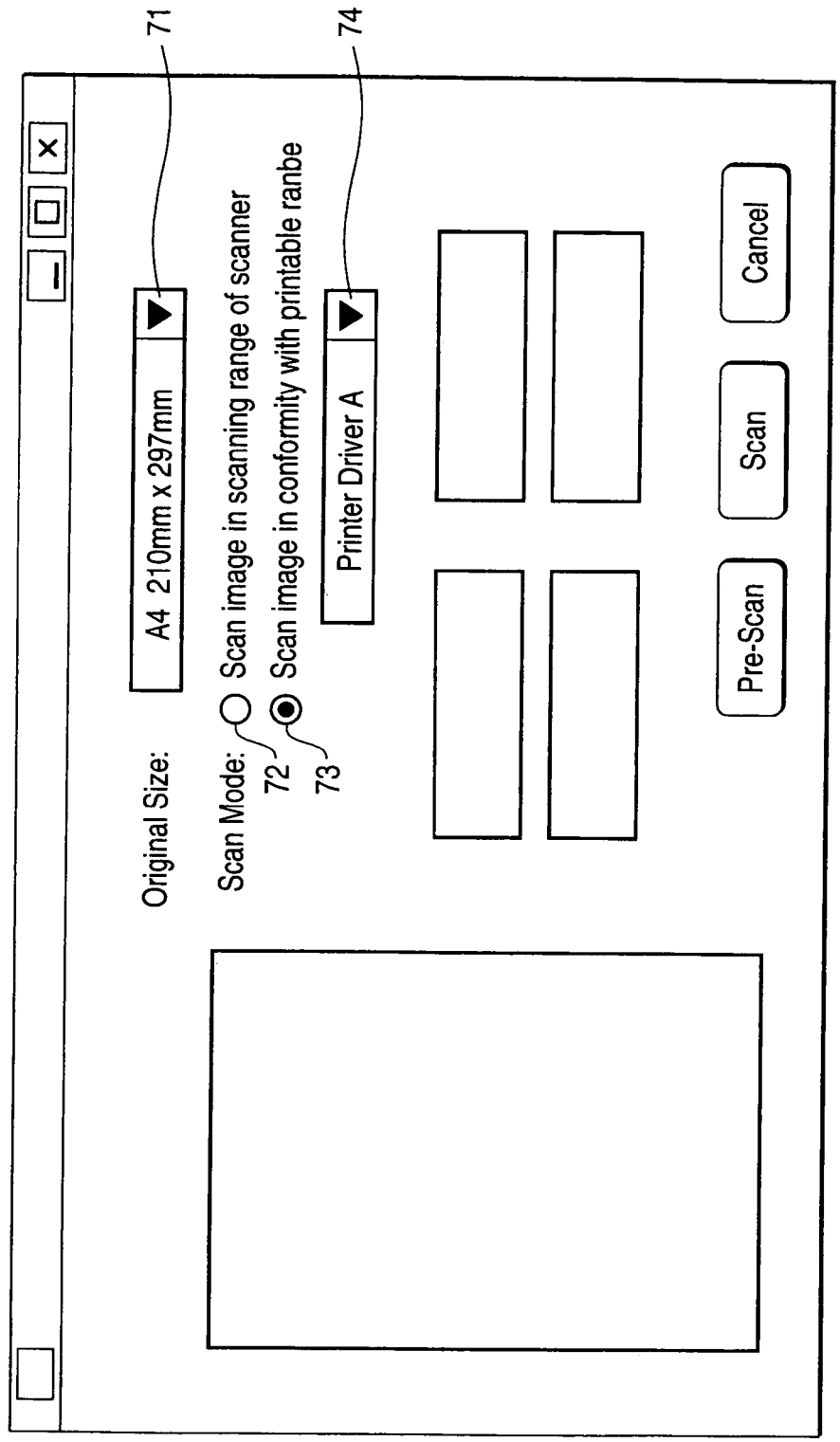

SCANNER DRIVER FOR AN INFORMATION PROCESSING APPARATUS AND COPY SYSTEM

This is a continuation of application Ser. No. 10/973,355 filed Oct. 27, 2004, which claims priority to JP2003-373990, filed Nov. 4, 2003. The disclosure of the prior applications are hereby incorporated by reference herein in its entirety.

BACKGROUND OF THE INVENTION

1. Field of the Invention

The invention relates to a scanner driver program for use in an information processing apparatus capable of transmitting/receiving information to/from a scanner and a printer, the information processing apparatus having the scanner driver program, and a copy system having the information processing apparatus including the scanner driver program.

2. Description of the Related Art

An image processing system in which a scanner device having a function of reading an image and a printer device having a function of printing image data are connected to a host computer such as a personal computer via communication media is known in a related art (e.g. JP-A-2001-345974). The image processing system capable of making the printer device print an image read by the scanner device is usually called a copy system.

In such a copy system, there may be a difference between a readable range of the scanner device and a printable range of the printer device. In such a case, the image read by the scanner device is printed by the printer device in a printing mode determined by processing of an application. For example, when the readable range is larger than the printable range, the size of an image read by the scanner device is larger than the size of the printable range. Accordingly, the image read by the scanner device is printed in alignment with one end of the printable range as shown in FIGS. 9A to 9C. Alternatively, in some cases, printing may be performed so that the image read by the scanner device can be reduced to be small enough to be fitted into the printable range as shown in FIG. 9D. Each shaded portion in FIGS. 9A-9D shows the image read by the scanner device.

JP-A-2001-345974 is referred to as a related art.

However, in the related art, when the printing mode as shown in FIGS. 9A-9D is executed by processing of the application, the position of an image in a printed result may be shifted from the position of an image on a read original (FIGS. 9A-9C), or the image on the printed result may be reduced in comparison with the image on the read original (FIG. 9D). Thus, a printed result expected by a user cannot be obtained.

SUMMARY OF THE INVENTION

The object of the invention is to provide a scanner driver program for controlling a printer to print an image read by a scanner without changing the position and size of the image, an information processing apparatus having the scanner driver program, and a copy system having the information processing apparatus including the scanner driver program.

The invention provides a scanner driver program for an information processing apparatus capable of transmitting/receiving information to/from a scanner and a printer. The information processing apparatus is operated by an application program to implement an instruction function of giving the printer an instruction to print an image read by the scanner in alignment with at least one end of a printable range belonging to a print paper size to be printed. The scanner driver program allows the information processing apparatus to implement: a determination function of determining a readable range of a read paper size to be read by the scanner; an acquisition function of executing a printer driver program prepared for the printer so as to acquire a printable range belonging to a print paper size as large as the read paper size; and a control function of making control to print an image within an overlapping range between the readable range and the printable range in accordance with an instruction of the instruction function when the readable range determined by the determination function includes the printable range acquired by the acquisition function.

The invention also provides an information processing apparatus capable of transmitting/receiving information to/from a scanner and a printer. The information processing apparatus includes in a memory: an application program having an instruction function of giving the printer an instruction to print an image read by the scanner in alignment with at least one end of a printable range belonging to a print paper size to be printed; and a scanner driver program having a determination function of determining a readable range of a read paper size to be read by the scanner, an acquisition function of executing a printer driver program prepared for the printer so as to acquire a printable range belonging to a print paper size as large as the read paper size, and a control function of making control to print an image within an overlapping range between the readable range and the printable range in accordance with an instruction of the instruction function when the readable range determined by the determination function includes the printable range acquired by the acquisition function.

The invention also provides a copy system includes a scanner, a printer, and an information processing apparatus capable of transmitting/receiving information to/from the scanner and the printer, the information processing apparatus including: an application program having an instruction function of giving the printer an instruction to print an image read by the scanner in alignment with at least one end of a printable range belonging to a print paper size to be printed; and a scanner driver program having a determination function of determining a readable range of a read paper size to be read by the scanner, an acquisition function of executing a printer driver program prepared for the printer so as to acquire a printable range belonging to a print paper size as large as the read paper size, and a control function of making control to print an image within an overlapping range between the readable range and the printable range in accordance with an instruction of the instruction function when the readable range determined by the determination function includes the printable range acquired by the acquisition function.

According to the scanner driver program, the information processing apparatus and the copy system, an image of a read original read by the scanner can be printed by the printer without changing the position and size (scale) even when the readable range of the scanner is larger than the printable range of the printer.

The invention also provides a scanner driver program for an information processing apparatus capable of transmitting/receiving information to/from a scanner and a printer. The information processing apparatus is operated by an application program to implement an instruction function of giving the printer an instruction to print an image read by the scanner in alignment with at least one end of a printable range belonging to a print paper size to be printed. The scanner driver program allows the information processing apparatus to implement: a determination function of determining a readable range of a read paper size to be read by the scanner; an acquisition function of executing a printer driver program prepared for the printer so as to acquire a printable range belonging to a print paper size as large as the read paper size; a read function of reading an image in the readable range determined by the determination function; an addition function of adding a blank corresponding to a range of the printable range not overlapping the readable range to the image read by the read function when the printable range acquired by the acquisition function includes the readable range determined by the determination function; and a control function of making control to print the image added with the blank by the addition function in accordance with an instruction of the instruction function.

The invention also provides an information processing apparatus capable of transmitting/receiving information to/from a scanner and a printer. The information processing apparatus includes in a memory: an application program having an instruction function of giving the printer an instruction to print an image read by the scanner in alignment with at least one end of a printable range belonging to a print paper size to be printed; and a scanner driver program having a determination function of determining a readable range of a read paper size to be read by the scanner, an acquisition function of executing a printer driver program prepared for the printer so as to acquire a printable range belonging to a print paper size as large as the read paper size, a read function of reading an image in the readable range determined by the determination function, an addition function of adding a blank corresponding to a range of the printable range not overlapping the readable range to the image read by the read function when the printable range acquired by the acquisition function includes the readable range determined by the determination function, and a control function of making control to print the image added with the blank by the addition function in accordance with an instruction of the instruction function.

The invention also provides a copy system includes a scanner, a printer, and an information processing apparatus capable of transmitting/receiving information to/from the scanner and the printer, the information processing apparatus including: an application program having an instruction function of giving the printer an instruction to print an image read by the scanner in alignment with at least one end of a printable range belonging to a print paper size to be printed; and a scanner driver program having a determination function of determining a readable range of a read paper size to be read by the scanner, an acquisition function of executing a printer driver program prepared for the printer so as to acquire a printable range belonging to a print paper size as large as the read paper size, a read function of reading an image in the readable range determined by the determination function, an addition function of adding a blank corresponding to a range of the printable range not overlapping the readable range to the image read by the read function when the printable range acquired by the acquisition function includes the readable range determined by the determination function, and a control function of making control to print the image added with the blank by the addition function in accordance with an instruction of the instruction function.

According to the scanner driver program, the information processing apparatus and the copy system, an image of a read original read by the scanner can be printed by the printer without changing the position and size (scale) even when the readable range is smaller than the printable range.

The invention also provides a scanner driver program for an information processing apparatus capable of transmitting/receiving information to/from a scanner and a printer. The information processing apparatus is operated by an application program to implement an instruction function of giving the printer an instruction to print an image read by the scanner in alignment with at least one end of a printable range belonging to a print paper size to be printed. The scanner driver program allows the information processing apparatus to implement: a determination function of determining a readable range of a read paper size to be read by the scanner; an acquisition function of executing a printer driver program prepared for the printer so as to acquire a printable range belonging to a print paper size as large as the read paper size; a change function of changing a read range of an image to be read by the scanner to an overlapping range where the readable range determined by the determination function and the printable range acquired by the acquisition function overlap each other; a read function of reading an image in the read range changed by the change function; an addition function of adding a blank corresponding to a range of the printable range not overlapping the readable range to the image read by the read function when the printable range acquired by the acquisition function includes the range not overlapping the readable range determined by the determination function; and a control function of making control to print the image read by the read function in accordance with an instruction of the instruction function when the printable range does not include the range not overlapping the readable range, and making control to print the image added with the blank by the addition function in accordance with an instruction of the instruction function when the printable range includes the range not overlapping the readable range.

The invention also provides an information processing apparatus capable of transmitting/receiving information to/from a scanner and a printer. The information processing apparatus includes in a memory: an application program having an instruction function of giving the printer an instruction to print an image read by the scanner in alignment with at least one end of a printable range belonging to a print paper size to be printed; and a scanner driver program having a determination function of determining a readable range of a read paper size to be read by the scanner; an acquisition function of executing a printer driver program prepared for the printer so as to acquire a printable range belonging to a print paper size as large as the read paper size; a change function of changing a read range of an image to be read by the scanner to an overlapping range where the readable range determined by the determination function and the printable range acquired by the acquisition function overlap each other; a read function of reading an image in the read range changed by the change function; an addition function of adding a blank corresponding to a range of the printable range not overlapping the readable range to the image read by the read function when the printable range acquired by the acquisition function includes the range not overlapping the readable range determined by the determination function; and a control function of making control to print the image read by the read function in accordance with an instruction of the instruction function when the printable range does not include the range not overlapping the readable range, and making control to print the image added with the blank by the addition function in accordance with an instruction of the instruction function when the printable range includes the range not overlapping the readable range.

The invention also provides a copy system includes a scanner, a printer, and an information processing apparatus capable of transmitting/receiving information to/from the scanner and the printer, the information processing apparatus including: an application program having an instruction function of giving the printer an instruction to print an image read by the scanner in alignment with at least one end of a printable range belonging to a print paper size to be printed; and a scanner driver program having a determination function of determining a readable range of a read paper size to be read by the scanner; an acquisition function of executing a printer driver program prepared for the printer so as to acquire a printable range belonging to a print paper size as large as the read paper size; a change function of changing a read range of an image to be read by the scanner to an overlapping range where the readable range determined by the determination function and the printable range acquired by the acquisition function overlap each other; a read function of reading an image in the read range changed by the change function; an addition function of adding a blank corresponding to a range of the printable range not overlapping the readable range to the image read by the reading function when the printable range acquired by the acquisition function includes the range not overlapping the readable range determined by the determination function; and a control function of making control to print the image read by the reading function in accordance with an instruction of the instruction function when the printable range does not include the range not overlapping the readable range, and making control to print the image added with the blank by the addition function in accordance with an instruction of the instruction function when the printable range includes the range not overlapping the readable range.

According to the scanner driver program, the information processing apparatus and the copy system, an image of a read original read by the scanner can be printed by the printer without changing the position and size (scale) even when there is a difference between the readable range and the printable range.

BRIEF DESCRIPTION OF THE DRAWINGS

FIGS. 3A and 3B are explanatory views showing a readable range of a scanner 2 with respect to an A4 read paper size and a printable range of a printer 3a with respect to an A4 print paper size when "Printer Driver A" is selected by a button 74 on the screen of FIG. 7 so as to set a printer driver 50a;

FIG. 7 is an explanatory view showing an example of a user interface about read setting;

DETAILED DESCRIPTION OF THE PREFERRED EMBODIMENTS

An embodiment of the invention will be described below with reference to the drawings.

Figure 1:
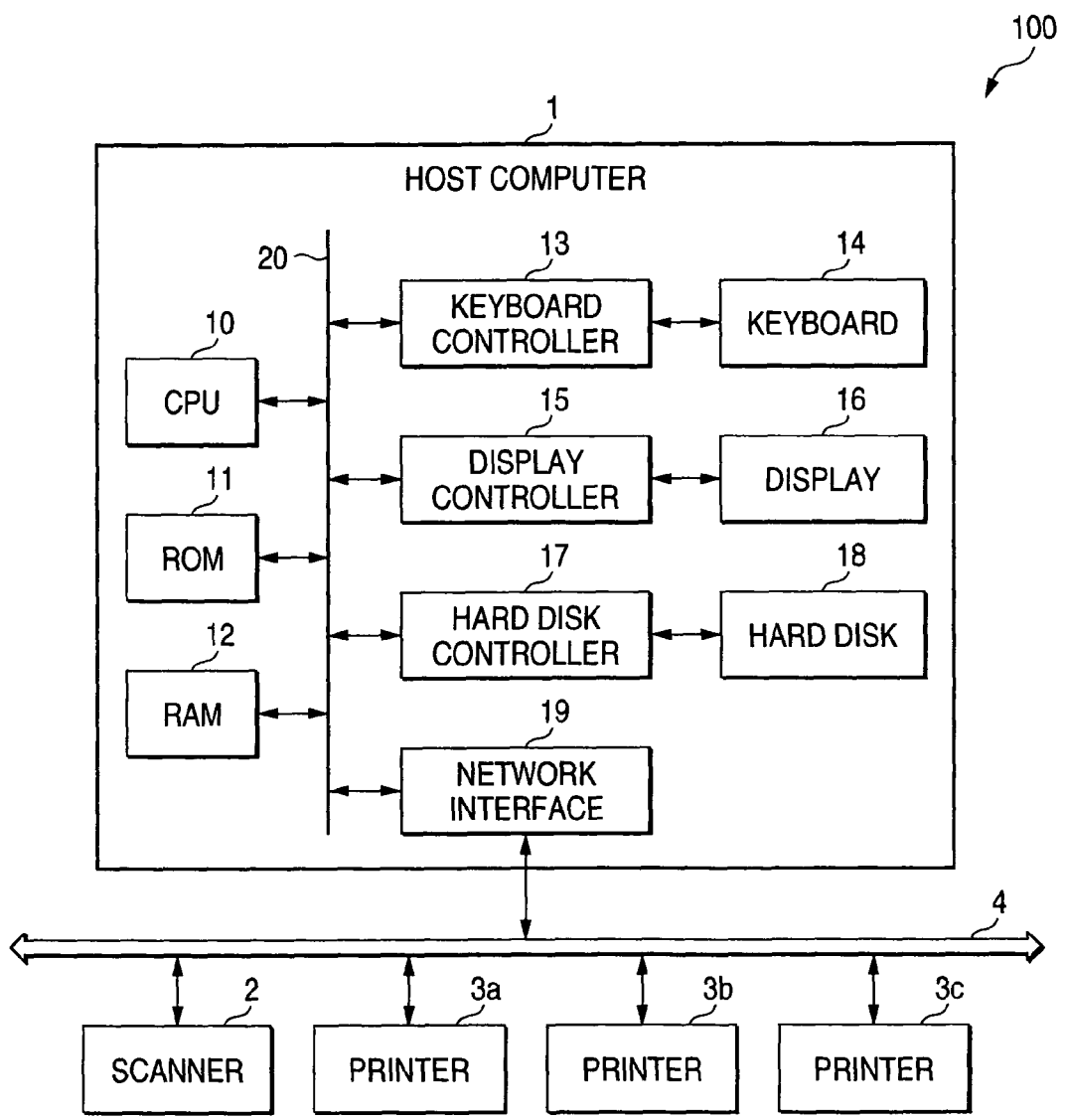
FIG. 1 is a block diagram showing the configuration of a copy system 100.

FIG. 1 is a block diagram showing the configuration of a copy system 100 according to the embodiment.

The copy system 100 shown in FIG. 1 is configured by a host computer 1 serving as information processing apparatus, a scanner 2, and printers 3a, 3b and 3c. In addition, the host computer 1, the scanner 2 and the printers 3a, 3b and 3c are connected to one another through a network 4 so that the host computer 1 can transmit/receive information to/from the scanner 2 and the printers 3a, 3b and 3c.

The host computer 1 has a CPU 10, a ROM 11, a RAM 12, a keyboard controller 13, a display controller 15, a hard disk controller 17, a keyboard 14, a display 16, a hard disk 18 and a network interface 19. The host computer 1 executes a documentation process, an image read process and an image print process based on programs stored in the ROM 11 or the hard disk 18.

The CPU 10 is a central processing portion for generally controlling each device connected to a system bus 20. The CPU 10 opens one of various registered user interfaces in accordance with an instruction given by a mouse cursor etc. on the display 16 or the like, and executes various data processings in accordance with the command. When a user is to execute an image reading process using the scanner 2 as will be described later, the user opens a user interface related to setting about the image reading process so that the user can do setting about the image reading process for a scanner driver 70. On the other hand, when the user is to execute a print process using one of the printers 3a-3c, the user opens a user interface related to setting about the print process so that the user can do setting about the print process for a printer driver 50a-50c which will be described later. The printer drivers 50a, 50b and 50c are provided correspondingly to the printers 3a, 3b and 3c respectively. When, for example, the user is to execute a print process using the printer 3a, the user starts up the corresponding printer driver 50a to execute the print process.

The ROM 11 stores various programs to be executed for performing a documentation process and so on, an operation (OS) program serving as a control program of the CPU 10, etc.

The RAM 12 serves as a work area to be used when the CPU 10 executes various programs stored in the ROM 11.

The keyboard controller 13 controls key input from the keyboard 14. The display controller 15 controls display on the display 16. The hard disk controller 17 controls access between the CPU 10 and the hard disk 18. The keyboard 14 has various keys. The display 16 displays user interfaces and so on. The hard disk 18 stores an application 30, the scanner driver 70, the printer drivers 50a to 50c, etc.

The network interface 19 serves as an interface for inputting and outputting information from and to the scanner 2 and the printers 3a, 3b and 3c via the network 4.

The scanner 2 reads an image from an original and outputs the image to the host computer 1. The image read by the scanner 2 is supplied to the host computer 1 through the network 4.

Each printer 3a-3c receives a document created by a documentation process of the host computer 1 or an image read by the scanner 2 via the network 4, and prints it out.

Figure 2:
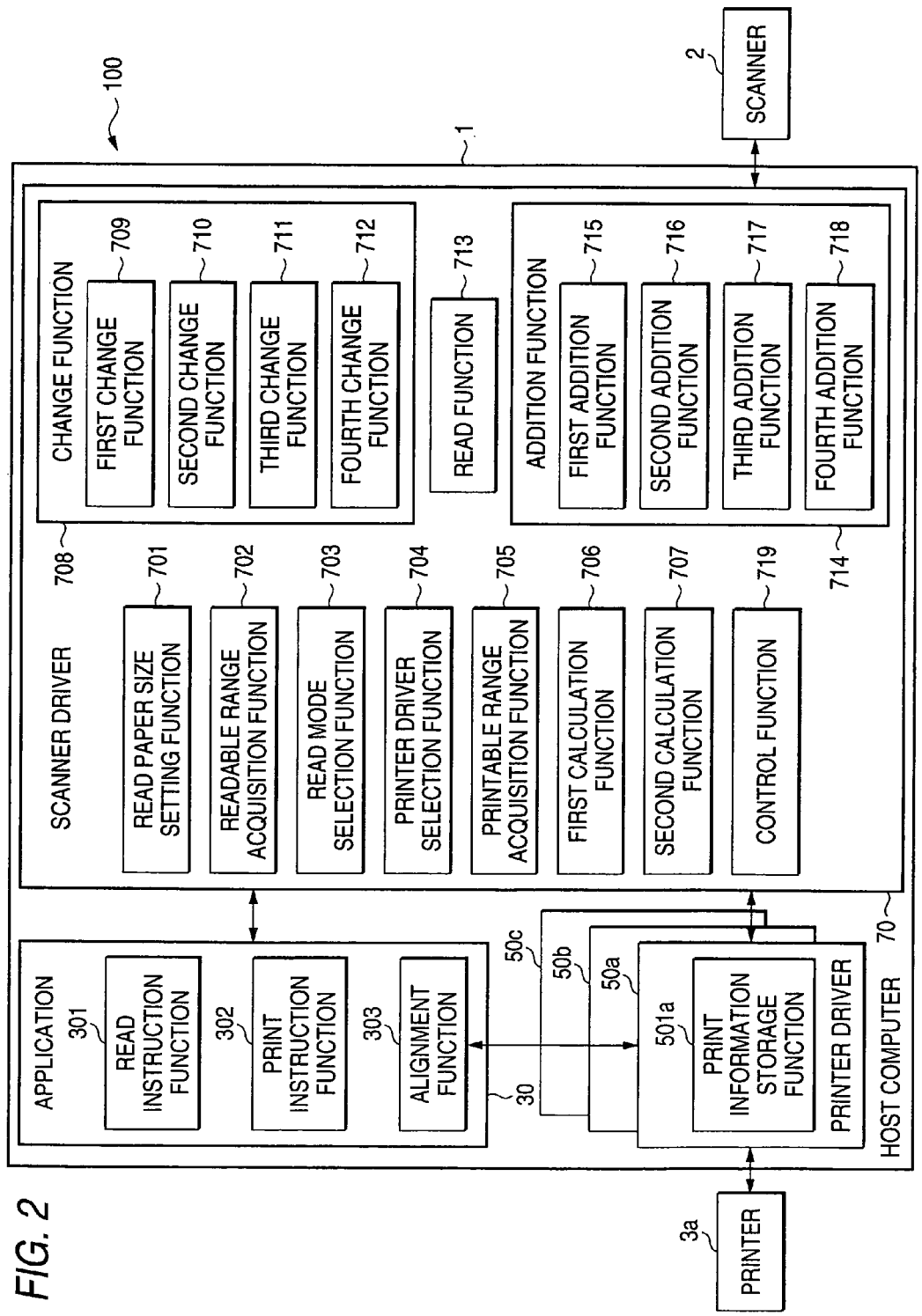
FIG. 2 is a conceptual diagram showing functions to be exerted by various programs stored in a hard disk 18 and executed by a CPU 10.

FIG. 2 is a conceptual diagram showing functions to be exerted by various programs stored in the hard disk 18 and executed by the CPU 10.

In FIG. 2, the application 30, the scanner driver 70 and the printer drivers 50a to 50c are stored in the hard disk 18 in FIG. 1. The application 30, the scanner driver 70 and the printer drivers 50a to 50c are programs to be loaded into the RAM 12 and executed by the OS.

Description will be made below about specific functions of the application 30, the scanner driver 70 and the printer drivers 50a to 50c according to the invention.

The application 30 can execute the scanner driver 70 and each printer driver 50a, 50b, 50c so as to control the scanner 2 and each printer 3a, 3b, 3c. That is, the application 30 can execute the scanner driver 70 to operate the scanner 2 and thereby read an image, and can execute the printer driver 50a-50c to operate the printer 3a-3c and thereby print the image. The application 30 has a read instruction function 301, a print instruction function 302 and an alignment function 303.

The read instruction function 301 is a function of giving the scanner driver 70 an instruction to control the scanner 2 to read an image. When the user carries out a read start operation through a keyboard or a mouse on a user interface provided by the application 30, the read instruction function 301 can be executed to give the scanner driver 70 an instruction to read an image.

The print instruction function 302 is a function of giving each printer driver 50a, 50b, 50c an instruction to control the corresponding printer 3a, 3b, 3c to print an image. For example, assume that the user wants to print using the printer 3a. In this case, when the user carries out a print start operation through a keyboard or a mouse on a user interface provided by the application 30, the print instruction function 302 can be executed to give the printer driver 50a an instruction to print an image.

The alignment function 303 includes a function of carrying out a layout process when an image read by the scanner 2 is printed by any one of the printers 3a, 3b and 3c. The layout process is a process for laying out the read image so that it can be printed in alignment with one end of a printable range of the printer. To print an image, the user issues a print instruction through the print instruction function 302 so as to activate one of the printer drivers 50a-50c for performing printing, and give a print instruction thereto. The printer driver 50a-50c given the print instruction displays a user interface for print setting on the display 16 so that settings such as a print paper size can be done. The alignment function 303 acquires the set print paper size and a printable range corresponding to the print paper size from the print driver 50a-50c given the print instruction. The alignment function 303 calculates a print start point of the image read by the scanner 2. According to the embodiment, the print start point of the image read by the scanner is calculated as a fifth corner of the printable range which will be described later. The application 30 outputs the calculated print start point to the printer driver 50 together with the image read by the scanner 2. Thus, the printer driver 50a-50c can print the image read by the scanner 2 in alignment with the print start point obtained from the application 30. For example, assume that the user wants to use the printer 3a to print out an image read by the scanner 2. In this case, the user activates the printer driver 50a to set the print paper size. The alignment function 303 acquires information about the set print paper size and so on from the printer driver 50a, and calculates a print start point of the read image. After that, the image read by the scanner 2 and information including the calculated print start point are output from the application 30 to the printer driver 50a, and the image is printed in alignment with the print start point. The instruction function is configured by the print instruction function 302 and the alignment function 303. The printable range will be described in detail later.

The scanner driver 70 serves to control the operation of reading an image by the scanner 2 and the processing of the read image. The scanner driver 70 has a read paper size setting function 701, a readable range acquisition function 702 as a determination function, a read mode selection function 703, a printer driver selection function 704 as a selection function, a printable range acquisition function 705 as an acquisition function, a first calculation function 706, a second calculation function 707, a change function 708, a read function 713, an addition function 714 and a control function 719.

The read paper size setting function 701 is a function of setting the paper size of an original to be read by the scanner 2. In the embodiment, when an instruction to read an image is given by the read instruction function 301 of the application 30, the scanner driver 70 displays a user interface shown in FIG. 7 on the display 16. The user can use a mouse cursor or the like to operate a button 71 on the user interface 71 so as to set the read paper size. Sizes A5, A4, A3, B5, B4, etc. can be set as the read paper size. In the example of FIG. 7, the size "A4" is set so that an A4-size original can be read.

Figure 3A:
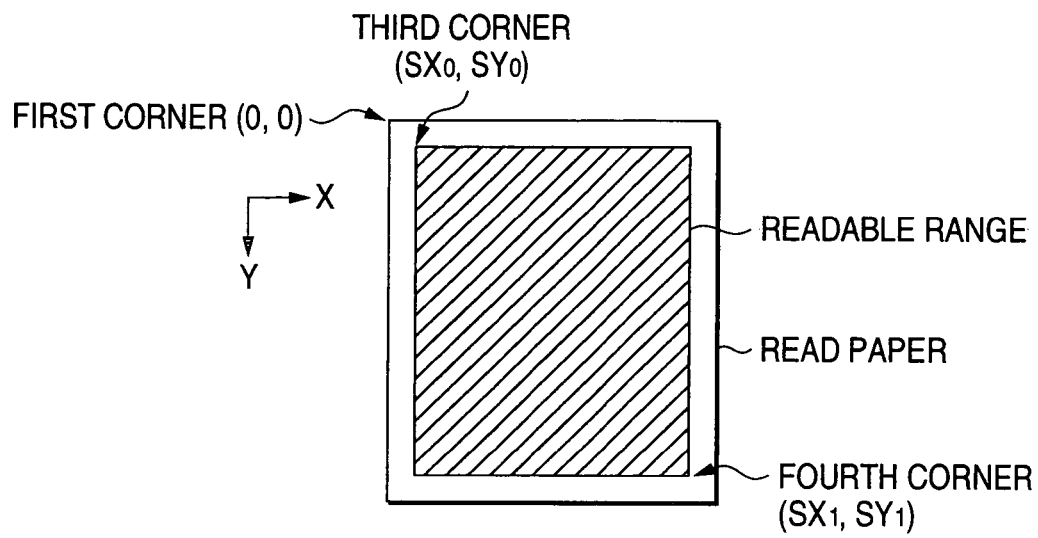

The readable range acquisition function 702 serves to acquire a readable range corresponding to the read paper size set by the read paper size setting function 701. The readable range is information belonging to the scanner driver 70 and corresponding to the read paper size. The readable range means a range obtained by subtracting, from the set read paper size, a range which is unreadable due to the mechanical performance of the scanner for reading an image. FIG. 3A is an explanatory view showing the state of the readable range of read paper when the A4 read paper size has been set as shown in the example of FIG. 7. In this case, the shaded portion in FIG. 3A is the readable range.

The read mode selection function 703 is a function of selecting a mode for reading an image by the scanner 2. The user can alternatively check one of check boxes 72 and 73 displayed on the display 16 as shown in FIG. 7 in accordance with a read instruction of the read instruction function 301, so as to select a read mode. In the example of FIG. 7, when the check box 72 is checked, a mode "scan image in scanning range of scanner" can be selected. When the check body 73 is checked, a mode "scan image in conformity to printable range" can be selected. When the mode "scan image in scanning range of scanner" is selected, the scanner 2 is allowed to scan an image in the readable range of the set read paper size. When the mode "scan image in conformity to printable range" is selected, the scanner 2 is allowed to scan an image in consideration of the printable range acquired by the printable range acquisition function 705 which will be described later. Detailed description will be made later about specific effect when the mode "scan image in conformity to printable range" is selected.

The printer driver selection function 704 is a function of selecting one of the three printer drivers 50a, 50b and 50c stored in the hard disk 18 of the host computer 1. The user operates the user interface displayed on the display 16 in accordance with an image read instruction as shown in FIG. 7, so as to select one of the printer drivers 50a-50c corresponding to one of the printers 3a-3c to be used for printing actually. The printer driver can be selected by operating a button 74 in FIG. 7. In the embodiment, "Printer Driver A", "Printer Driver B" and "Printer Driver C" can be selected, and they correspond to the printer drivers 50a, 50b and 50c respectively. The printer driver selection using the printer driver selection function 704 can be performed only when the check box 73 has been checked to select the mode "scan image in conformity to printable range". To make the scanner 2 read an image in consideration of the printable range acquired by the printable range acquisition function 705, it is necessary to specify the printer driver to be used. According to the example of FIG. 7, Printer Driver A is selected so that by use of the printer driver 50a, the image read by the scanner 2 can be printed by the printer 3a.

Figure 3B:
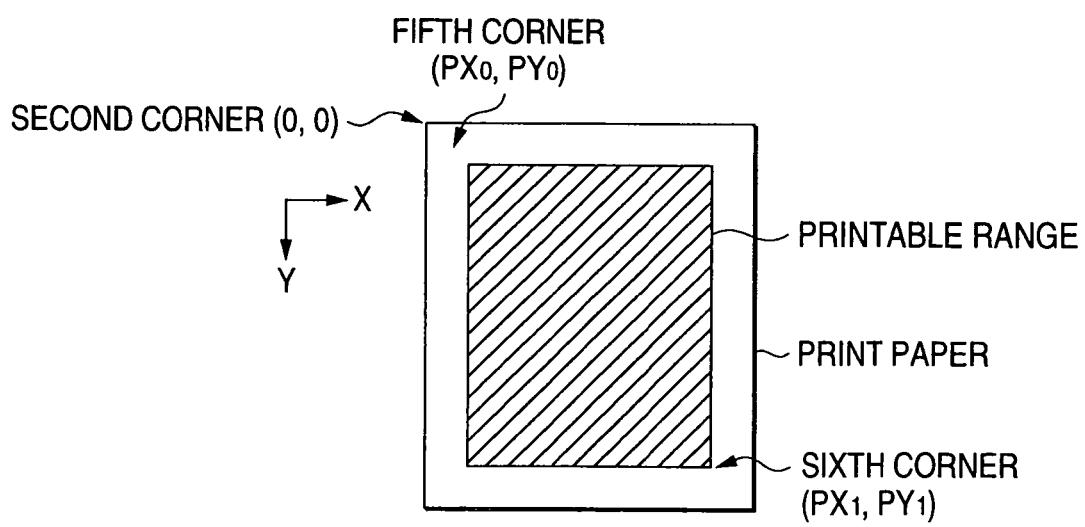

By the printable range acquisition function 705, a printable range corresponding to a print paper size as large as the read paper size set by the read paper size setting function 701 is acquired from the printer driver 50a-50c selected by the printer driver selection function 704. In the example of FIG. 7, the read paper size "A4" is set by the button 71, and "Printer Driver A" is set by the button 74. Therefore, the printable range acquisition function 705 acquires a printable range corresponding to the print paper size "A4" from the printer driver 50a. The printable range means a range obtained by subtracting, from the print paper size to be used, a range which is unprintable due to the mechanical performance of the printer. FIG. 3B is an explanatory view showing the state of a printable range corresponding to the A4 print paper size and acquired from the printer driver 50a in the example set in FIG. 7. In this case, the shaded portion in FIG. 3B is the printable range.

The first calculation function 706 is a function of calculating coordinates ($SX_0$, $SY_0$) of a third corner and coordinates ($SX_1$, $SY_1$) of a fourth corner forming the readable range acquired by the readable range acquisition function 702. The third corner means a corner of the readable range closest to an origin when one corner of the read paper is regarded as the origin. The origin here forms the first corner. In FIG. 3A, the third corner is shown on the left upper side of the readable range. The fourth corner means, of the corners forming the readable range, a corner located diagonally with respect to the third corner. In FIG. 3A, the fourth corner is shown on the right lower side of the readable range.

The second calculation function 707 is a function of calculating coordinates ($PX_0$, $PY_0$) of a fifth corner and coordinates ($PX_1$, $PY_1$) of a sixth corner forming the printable range acquired by the printable range acquisition function 705. The fifth corner means a corner of the printable range closest to an origin when one corner of the print paper is regarded as the origin. The origin here forms the second corner. In FIG. 3B, the fifth corner is a left upper corner of the printable range. The sixth corner means, of the corners forming the printable range, a corner located diagonally with respect to the fifth corner. In FIG. 3B, the sixth corner is a right lower corner of the printable range.

The change function 708 serves to change a read range where an image should be read from an original, to a range different from the readable range on the basis of the positional relationship among the coordinates of the third to sixth corners calculated by the first and second calculation functions 706 and 707. The change function 708 has a first change function 709, a second change function 710, a third change function 711 and a fourth change function 712. The first change function 709 serves to compare the X-coordinate of the third corner with the X-coordinate of the fifth corner and change $SX_0$ to $PX_0$ when $SX_0<PX_0$. The second change function 710 serves to compare the Y-coordinate of the third corner with the Y-coordinate of the fifth corner and change $SY_0$ to $PY_0$ when $SY_0<PY_0$. The third change function 711 serves to compare the X-coordinate of the fourth corner with the X-coordinate of the sixth corner and change $SX_1$ to $PX_1$ when $SX_1>PX_1$. The fourth change function 712 serves to compare the Y-coordinate of the fourth corner with the Y-coordinate of the sixth corner and change $SY_1$ to $PY_1$ when $SY_1>PY_1$.

The read function 713 serves to make the scanner 2 read an image from an original in the read range changed and set by the change function 708.

The addition function 714 serves to add a blank to an outer edge of the image read through the scanner 2 by the read function 713, on the basis of the positional relationship among the third to sixth corners calculated by the first and second calculation functions 706 and 707. The addition function 714 has a first addition function 715, a second addition function 716, a third addition function 717 and a fourth addition function 718. The first addition function 715 serves to compare the X-coordinate of the third corner with the X-coordinate of the fifth corner and add a blank of width ($SX_0-PX_0$) to the left end of the image read by the read function when $SX_0>PX_0$. The second addition function 716 serves to compare the Y-coordinate of the third corner with the Y-coordinate of the fifth corner and add a blank of width ($SY_0-PY_0$) to the upper end of the image read by the read function when $SY_0>PY_0$. The third addition function 717 serves to compare the X-coordinate of the fourth corner with the X-coordinate of the sixth corner and add a blank of width ($PX_1-SX_1$) to the right end of the image read by the read function 713 when $SX_1<PX_1$. The fourth addition function 718 serves to compare the Y-coordinate of the fourth corner with the Y-coordinate of the sixth corner and add a blank of width ($PY_1-SY_1$) to the lower end of the image read by the read function when $SY_1<PY_1$.

The control function 719 is a function of providing the read image to the application 30 and giving the application 30 an instruction to make the printer driver 50a-50c print the image in a predetermined layout using the print instruction function 302 and the alignment function 303.

Each printer driver 50a-50c serves to control an image printing operation of its corresponding printer 3a-3c and processing of an image to be printed. The printer drivers 50a to 50c have paper information storage functions 501a, 501b and 501c respectively. Though not shown, the paper information storage functions 501b and 501c belong to the printer drivers 50b and 50c respectively.

Each paper information storage function 501a-501c stores a printable range for each print paper size to be printed. In response to a request from the printable range acquisition function 705 of the scanner driver 70, a printable range of each print paper size stored in the paper information storage function 501a-501c is output to the scanner driver 70 side. In this event, a printable range for printing in a print paper size as large as the read paper size acquired by the read paper size setting function 701 of the scanner driver 70 is output to the scanner driver 70 side. In the setting example of FIG. 7, the printable range acquisition function 705 of the scanner driver 70 gains access to the paper information storage function 501a of the printer driver 50a so as to acquire a printable range corresponding to the A4 print paper size.

Figure 4:
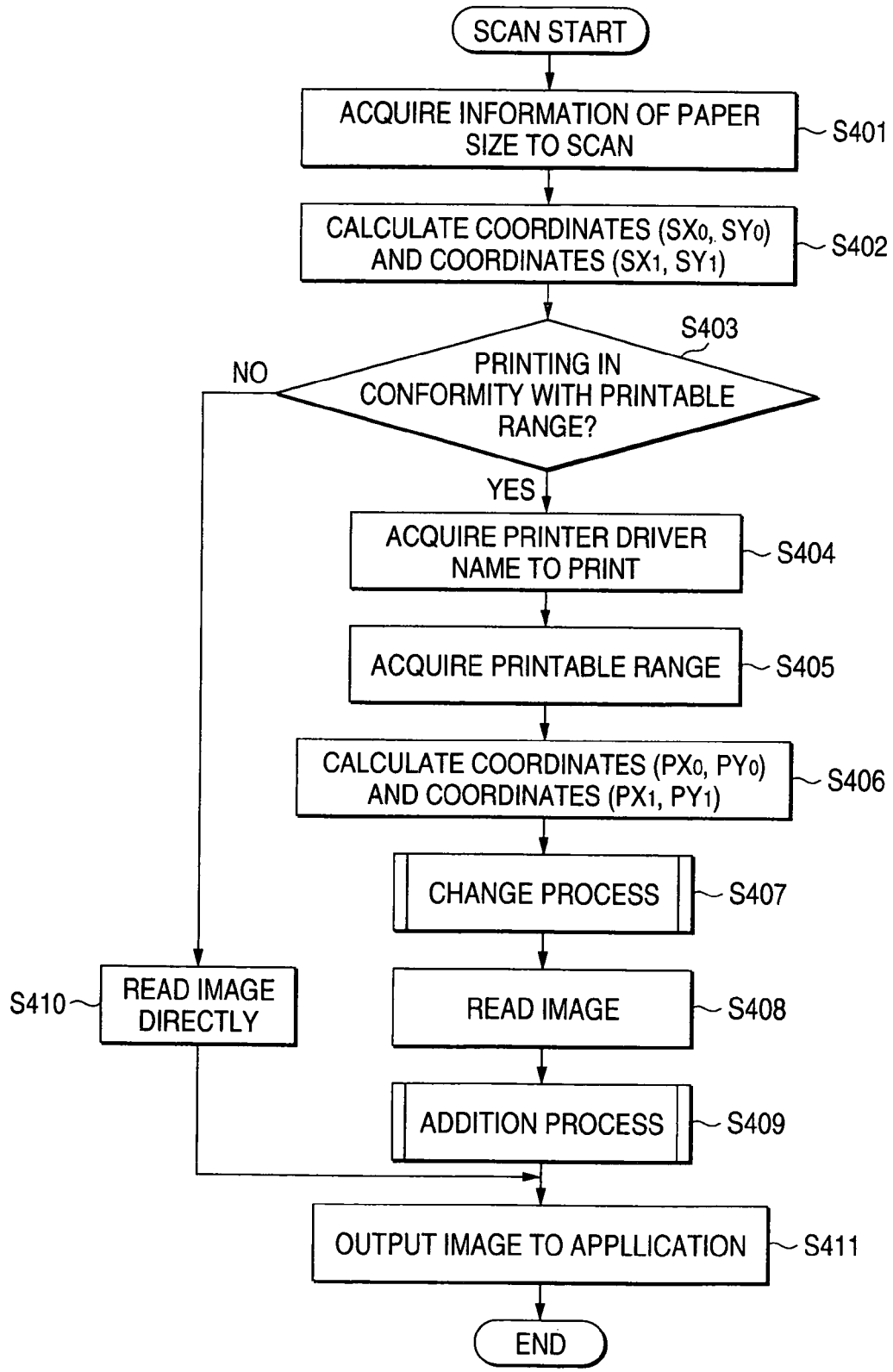
FIG. 4 is a flow chart showing the processing operation for reading an original using the scanner 2.

Next, description will be made about a processing operation for scanning an original using the scanner 2 according to the embodiment. FIG. 4 is a flow chart showing the processing operation for scanning an original using the scanner 2. The process shown in FIG. 4 is started in response to a read instruction issued by the read instruction function 301 of the application 30. The processing operation shown in FIG. 4 is executed by the scanner driver 70.

First, the process proceeds to Step 401 (hereinafter Step will be abbreviated to "S") upon reception of a read instruction.

In S401, based on a read paper size set by the read paper size setting function 701, a readable range corresponding to the read paper size is acquired. After acquiring the readable range, the process proceeds to S402. The processing of S401 is executed by the readable range acquisition function 702.

In S402, coordinates $(SX_0, SY_0)$ of a third corner and coordinates $(SX_1, SY_1)$ of a fourth corner of the acquired readable range are calculated. After that, the process proceeds to S403. Incidentally, the processing of S402 is implemented by the first calculation function 706.

In S403, it is decided whether to read an image in the readable range of the scanner 2 or to read the image in conformity with a printable range. When the mode "scan in scanning range of scanner" on the user interface of FIG. 7 has been selected by the read mode selection function 703 (S403, NO), the process jumps to S410. In S410, the scanner 2 is instructed to read an image in the readable range. After an image is read in the readable range of the scanner 2 in Step 410, the process proceeds to S411. When the mode "scan image in conformity with printable range" has been selected on the screen of FIG. 7 by the read mode selection function 703 (S403, YES), the process proceeds to S404.

In S404, a printer driver name selected by the printer driver selection function 704 is acquired. After the printer driver name is acquired, the process proceeds to S405.

In S405, based on the acquired printer driver name, one of the printer drivers 50a-50c having the printer driver name is accessed. A printable range corresponding to the print paper size as large as the read paper size set by the read paper size setting function 701 is acquired from the accessed printer driver 50a-50c. The processing of S405 is executed by the printable range acquisition function 705. After that, the process proceeds to S406.

In S406, coordinates $(PX_0, PY_0)$ of a fifth corner and coordinates $(PX_1, PY_1)$ of a sixth corner of the acquired printable range are calculated. The processing of S406 is implemented by the second calculation function 707. After that, the process proceeds to S407.

In S407, a change process is performed. The change process is a process for changing the read range of an original to be read by the scanner 2, to a range different from the readable range. The change process S407 is executed by the first change function 709, the second change function 710, the third change function 711 and the fourth change function 712. The change process will be described in detail later. When the change process is terminated, the process proceeds to S408.

In S408, an instruction to read an image from the original is given to the scanner 2. The processing of S408 is executed by the read function 713. After that, the process proceeds to S409.

In S409, an addition process is carried out. The addition process serves to add a blank to the image read in S408. The addition process is executed by the first addition function 715, the second addition function 716, the third addition function 717 and the fourth addition function 718. The addition process will be described in detail later. After the addition process, the process proceeds to S411.

In S411, the image is output to the application 30 side. Specifically, the read image is temporarily stored in the RAM 12 so that the application 30 can perform various processes on the RAM 12. After S411, the image read process is terminated.

Figure 5:
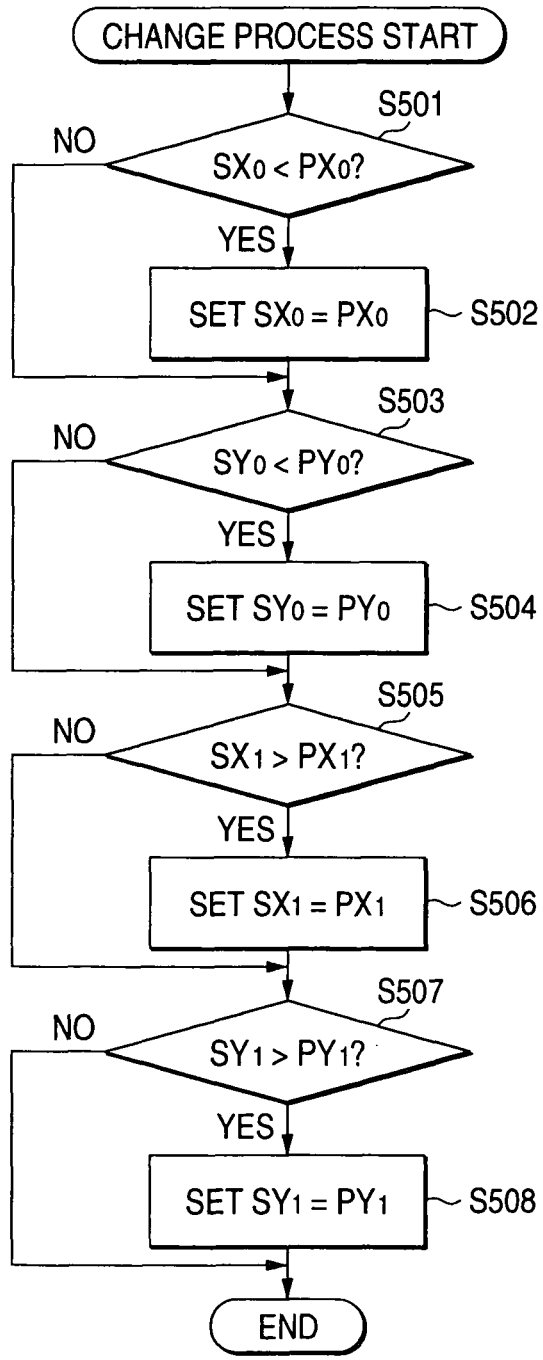
FIG. 5 is a flow chart showing the flow of a series of processings in a change process.

Next, description will be made about the change process of S407 in FIG. 4 with reference to FIG. 5. FIG. 5 is a flow chart showing the flow of a series of processings in the change process.

First, the process proceeds to S501. In S501, the X-coordinate of the third corner is compared with the X-coordinate of the fifth corner so that it is judged whether the relation $SX_0 < PX_0$ is satisfied or not. When not $SX_0 < PX_0$ (S501, NO), the process proceeds to S503 directly. When $SX_0 < PX_0$ (S501, YES), the process proceeds to S502.

In S502, the X-coordinate of the third corner is changed from $SX_0$ to $PX_0$. After that, the process proceeds to S503. The processings of S501 and S502 are executed by the first change function 709.

In S503, the Y-coordinate of the third corner is compared with the Y-coordinate of the fifth corner so that it is judged whether the relation $SY_0 < PY_0$ is satisfied or not. When not $SY_0 < PY_0$ (S503, NO), the process proceeds to S505 directly. When $SY_0 < PY_0$ (S503, YES), the process proceeds to S504.

In S504, the Y-coordinate of the third corner is changed from $SY_0$ to $PY_0$. After that, the process proceeds to S505. The processings of S503 and S504 are executed by the second change function 710.

In S505, the X-coordinate of the fourth corner is compared with the X-coordinate of the sixth corner so that it is judged whether the relation $SX_1 > PX_1$ is satisfied or not. When not $SX_1 > PX_1$ (S505, NO), the process proceeds to S507 directly. When $SX_1 > PX_1$ (S505, YES), the process proceeds to S506.

In S506, the X-coordinate of the fourth corner is changed from $SX_1$ to $PX_1$. After that, the process proceeds to S507. The processings of S505 and S506 are executed by the third change function 711.

In S507, the Y-coordinate of the fourth corner is compared with the Y-coordinate of the sixth corner so that it is judged whether the relation $SY_1 > PY_1$ is satisfied or not. When not $SY_1 > PY_1$ (S507, NO), the change process is terminated directly. When $SY_1 > PY_1$ (S507, YES), the process proceeds to S508.

In S508, the Y-coordinate of the fourth corner is changed from $SY_1$ to $PY_1$. After that, the change process is terminated. The processings of S507 and S508 are executed by the fourth change function 712.

Figure 6:
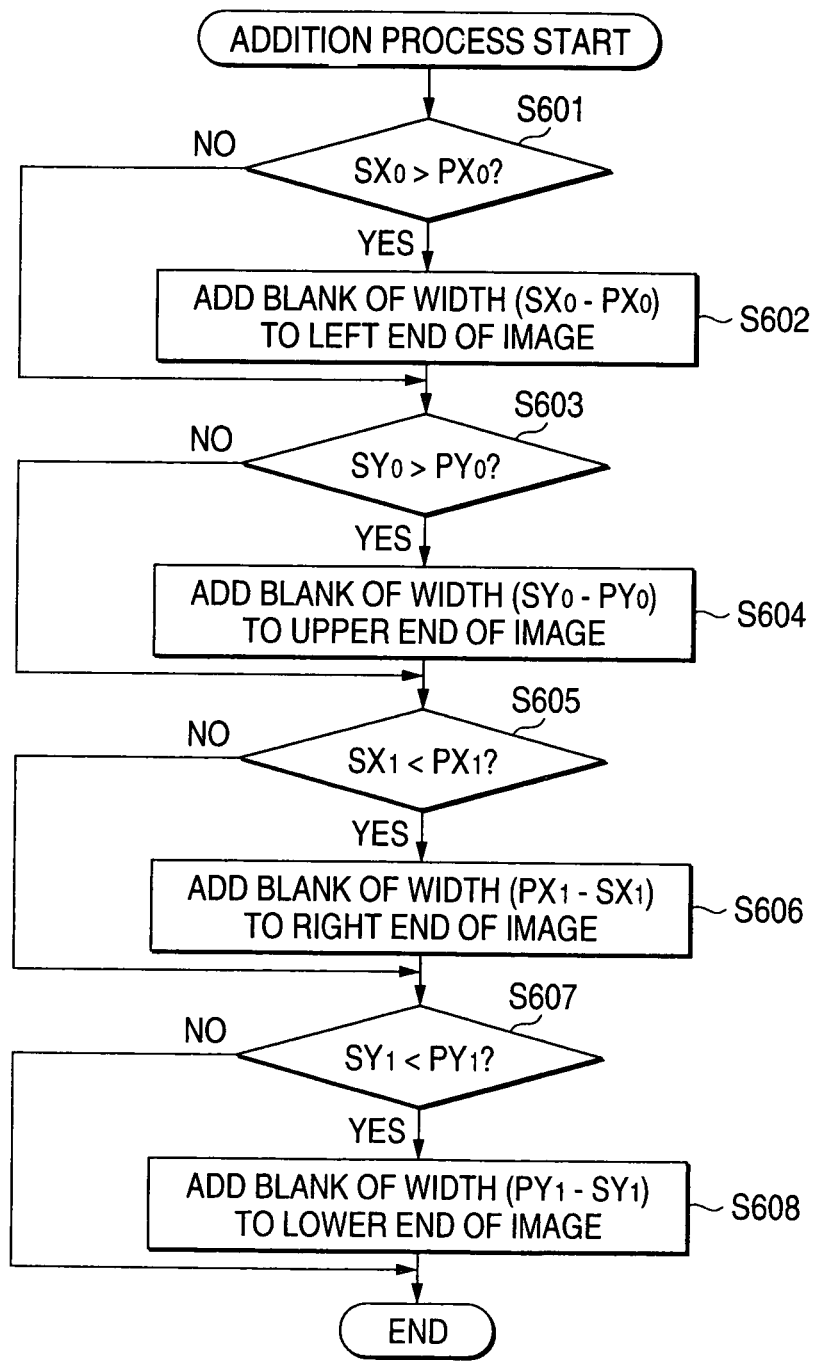
FIG. 6 is a flow chart showing the flow of a series of processings in an addition process.

Next, the addition process of S409 in FIG. 4 will be described with reference to FIG. 6. FIG. 6 is a flow chart showing the flow of a series of processings in the addition process.

First, the process proceeds to S601. In S601, the X-coordinate of the third corner is compared with the X-coordinate of the fifth corner so that it is judged whether the relation $SX_0 > PX_0$ is satisfied or not. When it is concluded that the relation $SX_0 > PX_0$ is not satisfied (S601, NO), the process proceeds to S603 directly. On the other hand, when it is concluded that the relation $SX_0 > PX_0$ is satisfied (S601, YES), the process proceeds to S602.

In S602, a range of width $(SX_0 - PX_0)$ is added to the left end (X-axis minus direction end with respect to the image) of the image read by the read function 713. After that, the process proceeds to S603. The processings of S601 and S602 are executed by the first addition function 715.

In S603, the Y-coordinate of the third corner is compared with the Y-coordinate of the fifth corner so that it is judged whether the relation $SY_0 > PY_0$ is satisfied or not. When it is concluded that the relation $SY_0 > PY_0$ is not satisfied (S603, NO), the process proceeds to S605 directly. On the other hand, when it is concluded that the relation $SY_0 > PY_0$ is satisfied (S603, YES), the process proceeds to S604.

In S604, a range of width $(SY_0 - PY_0)$ is added to the upper end (Y-axis minus direction end with respect to the image) of the image read by the read function 713. After that, the process proceeds to S605. The processings of S603 and S604 are executed by the second addition function 716.

In S605, the X-coordinate of the fourth corner is compared with the X-coordinate of the sixth corner so that it is judged whether the relation $SX_1<PX_1$ is satisfied or not. When it is concluded that the relation $SX_1<PX_1$ is not satisfied (S605, NO), the process proceeds to S607 directly. On the other hand, when it is concluded that the relation $SX_1<PX_1$ is satisfied (S605, YES), the process proceeds to S606.

In S606, a range of width $(PX_1-SX_1)$ is added to the right end (X-axis plus direction end with respect to the image) of the image read by the read function 713. After that, the process proceeds to S607. The processings of S605 and S606 are executed by the third addition function 717.

In S607, the Y-coordinate of the fourth corner is compared with the Y-coordinate of the sixth corner so that it is judged whether the relation $SY_1<PY_1$ is satisfied or not. When it is concluded that the relation $SY_1<PY_1$ is not satisfied (S607, NO), the addition process is terminated directly. On the other hand, when it is concluded that the relation $SY_1<PY_1$ is satisfied (S607, YES), the process proceeds to S608.

In S608, a range of width $(PY_1-SY_1)$ is added to the lower end (Y-axis plus direction end with respect to the image) of the image read by the read function 713. After that, the addition process is terminated. The processings of S607 and S608 are executed by the fourth addition function 718.

Figure 9A:
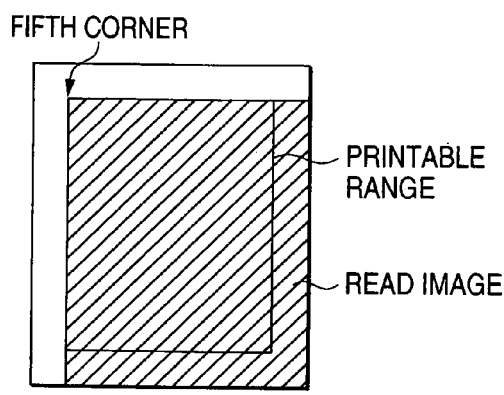
FIGS. 9A-9D are explanatory views showing examples of prints according to the related art when a readable range is larger than a printable range.
Figure 9B:
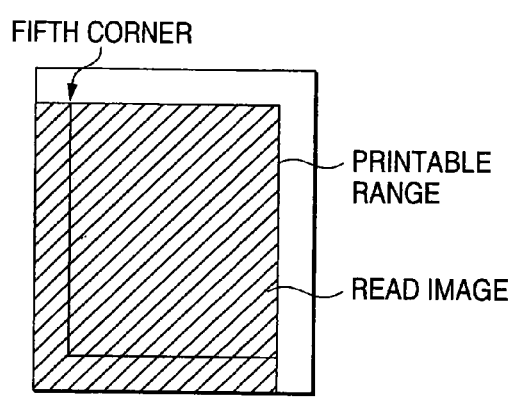
Figure 9C:
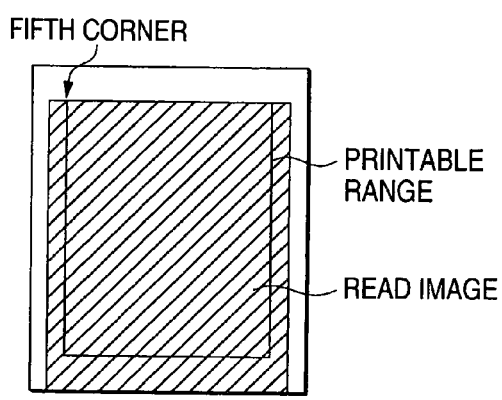
Figure 9D:
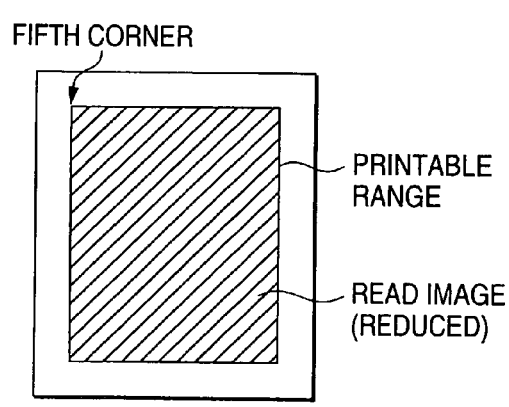

The processing operation of the scanner driver 70 will be described below using a specific example. In FIGS. 3A and 3B, the relations $SX_0<PX_0$, $SY_0<PY_0$, $SX_1>PX_1$ and $SY_1>PY_1$ are satisfied. Accordingly, YES is established in all the processings of S501, S503, S505 and S507 in the flow chart shown in FIG. 5, and NO is established in all the processings of S601, S603, S605 and S607 in the flow chart shown in FIG. 6. That is, the read range of the scanner 2 is changed from $SX_0$ to $PX_0$, from $SY_0$ to $PY_0$, from $SX_1$ to $PX_1$ and from $SY_1$ to $PY_1$ by the first change function 709, the second change function 710, the third change function 711 and the fourth change function 712 respectively, but the first addition function 715, the second addition function 716, the third addition function 717 and the fourth addition function 718 are not executed. As a result, the scanner 2 reads an image in the printable range of the printer 3a. The read image is output to the application 30 side. After the image is read by the scanner 2, an instruction to print the read image is given to the printer driver 50a by the print instruction function 302 of the application 30. In response to the print instruction from the application 30, the printer driver 50a displays a print setting screen on the display 16 so as to allow the user to set a print paper size. Here, the user sets a print paper size as large as the read paper size scanned by the scanner 2. The application 30 acquires a printable range of the paper size set by the printer driver 50a, and outputs the image read by the scanner 2 and a print start point of the image to the printer driver 50a. The printer driver 50a controls the printer so that the image output from the application 30 is printed at the print start point output likewise. In this event, the print start point is the fifth corner as described previously. According to the embodiment, however, the image having the same size as the printable range is output to the printer driver 50a. Thus, a difference between the position of the image read by the scanner 2 and the position of the image printed by the printer 3a as shown in FIG. 9A does not exist.

Figure 8A:
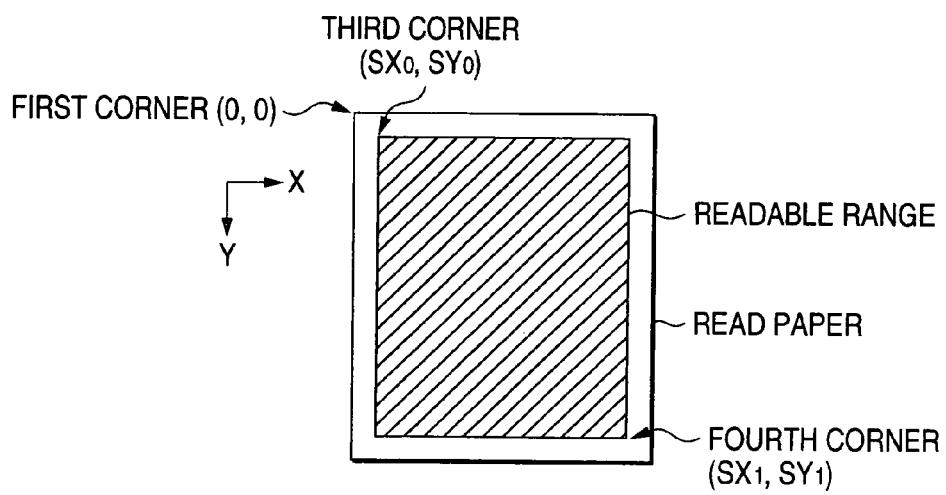
FIGS. 8A and 8B are explanatory views showing the readable range of the scanner 2 with respect to the A4 read paper size and the printable range of the printer 3b with respect to the A4 print paper size when "Printer Driver B" is selected by the button 74 on the screen of FIG. 7 so as to set a printer driver 50b.
Figure 8B:
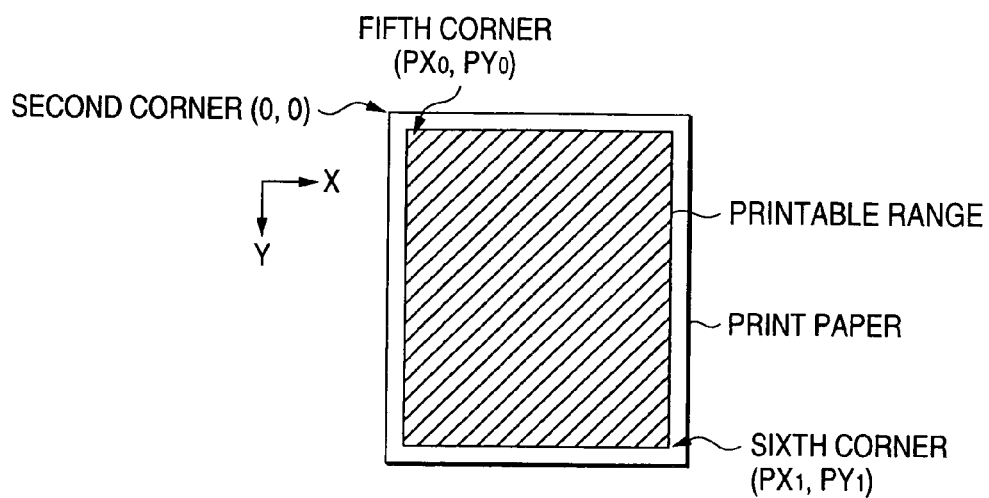
Figure 10:
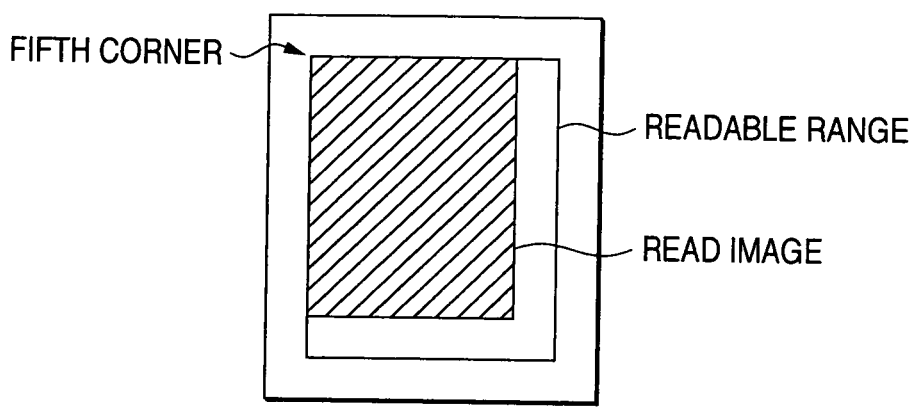
FIG. 10 is an explanatory view showing an example of a print according to the related art when the readable range is smaller than the printable range.

On the other hand, FIGS. 8A and 8B are explanatory views showing the readable range of the scanner 2 corresponding to the A4 read paper size and the printable range of the printer 3b corresponding to the A4 print paper size when "Printer Driver B" is selected by the button 74 on the screen of FIG. 7 so that the printer driver 5b is set. The readable range is shown in FIG. 8A, and the printable range is shown in FIG. 8B. In FIGS. 8A and 8B, are satisfied. Accordingly, NO is established in all the processings of S501, S503, S505 and S507 in the flow chart shown in FIG. 5, and YES is established in all the processings of S601, S603, S605 and S607 in the flow chart shown in FIG. 6. That is, the first change function 709, the second change function 710, the third change function 711 and the fourth change function 712 are not executed, but the first addition function 715, the second addition function 716, the third addition function 717 and the fourth addition function 718 are executed. As a result, the scanner 2 reads an image within the readable range, and a blank is added to a range where the printable range of the printer 3b does not overlap the readable range of the scanner 2. Due to the addition of the blank, the size of the image to be output to the application side 30 becomes as large as the size of the printable range of the printer 3b. Thus, a difference between the position of the image read by the scanner 2 and the position of the image printed by the printer 3b as shown in FIG. 10 dose not exist.

The embodiment of the invention has been described above. Not to say, the invention is not limited to the embodiment, but appropriate modifications can be made within the technical and conceptual scope of the invention.

The scanner driver program further allows the information processing apparatus to implement: a change function of changing a read range of an image to be read by the scanner to the overlapping range between the readable range and the printable range when the readable range determined by the determination function includes the printable range acquired by the acquisition function; and a read function of reading an image in the read range changed by the change function; wherein the control function makes control to print the image read by the read function in accordance with an instruction of the instruction function.

In the scanner driver program, the change function changes the read range to the overlapping range when of corners composing the readable range, two corners located diagonally are located out of the printable range.

In the scanner driver program, when a first corner which is any one of corners composing a region of the read paper size and a second corner which is one of corners composing a region of the print paper size corresponding to the same position as the first corner are regarded as origins of the regions respectively, the scanner driver program allows the information processing apparatus to implement: a first calculation function of calculating, of corners composing the readable range determined by the determination function, XY-coordinates $(SX_0, SY_0)$ of a third corner closest to the first corner and XY-coordinates $(SX_1, SY_1)$ of a fourth corner located diagonally with respect to the third corner; and a second calculation function of calculating, of corners composing the printable range acquired by the acquisition function, XY-coordinates $(PX_0, PY_0)$ of a fifth corner closest to the second corner and XY-coordinates $(PX_1, PY_1)$ of a sixth corner located diagonally with respect to the fifth corner; and the change function changes $SX_0$ to $PX_0$, $SY_0$ to $PX_0$, $SX_1$ to $PX_1$, and $SY_1$ to $PY_1$ when relations $SX_0<PX_0$, $SY_0<PY_0$, $SX_1>PX_1$ and $SY_1>PY_1$ are satisfied.

In the scanner driver program, the addition function adds the blank to the image read by the read function when diagonal two of corners composing the readable range are present inside the printable range.

In the scanner driver program, when a first corner which is any one of corners composing a region of the read paper size and a second corner which is one of corners composing a region of the print paper size corresponding to the same position as the first corner are regarded as origins of the regions respectively, the scanner driver program allows the information processing apparatus to implement: a first calculation function of calculating, of corners composing the readable range determined by the determination function, XY-coordinates ($SX_0$, $SY_0$) of a third corner closest to the first corner and XY-coordinates ($SX_1$, $SY_1$) of a fourth corner located diagonally with respect to the third corner; and a second calculation function of calculating, of corners composing the printable range acquired by the acquisition function, XY-coordinates ($PX_0$, $PY_0$) of a fifth corner closest to the second corner and XY-coordinates ($PX_1$, $PY_1$) of a sixth corner located diagonally with respect to the fifth corner; and the addition function adds a range of width ($SX_0$–$PX_0$) to an end of the image read by the read function, which end extends in a Y-direction from the third corner, adds a range of width ($SY_0$–$PY_0$) to an end of the image extending in an X-direction from the third corner, adds a range of width ($PX_1$–$SX_1$) to an end of the image extending in the Y-direction from the fourth corner, and adds a range of width ($PY_1$–$SY_1$) to an end of the image extending in the X-direction from the fourth corner when relations of $SX_0 > PX_0$, $SY_0 > PY_0$, $SX_1 < PX_1$ and $SY_1 < PY_1$ are satisfied.

In the scanner driver program, when a first corner which is any one of corners composing paper of the read paper size and a second corner which is one of corners composing paper of the print paper size corresponding to the same position as the first corner are regarded as origins of the papers respectively, the scanner driver program allows the information processing apparatus to implement: a first calculation function of calculating, of corners composing the readable range determined by the determination function, XY-coordinates ($SX_0$, $SY_0$) of a third corner closest to the first corner and XY-coordinates ($SX_1$, $SY_1$) of a fourth corner located diagonally with respect to the third corner; and a second calculation function of calculating, of corners composing the printable range acquired by the acquisition function, XY-coordinates ($PX_0$, $PY_0$) of a fifth corner closest to the second corner and XY-coordinates ($PX_1$, $PY_1$) of a sixth corner located diagonally with respect to the fifth corner; the change function includes: a first change function of changing $SX_0$ to $PX_0$ when $SX_0 < PX_0$; a second change function of changing $SY_0$ to $PY_0$ when $SY_0 < PY_0$; a third change function of changing $SX_1$ to $PX_1$ when $SX_1 > PX_1$; and a fourth change function of changing $SY_1$ to $PY_1$ when $SY_1 > PY_1$; and the addition function includes: a first addition function of adding a range of width ($SX_0$–$PX_0$) to an end of the image read by the read function, which end extends in a Y-direction from the third corner, when $SX_0 > PX_0$; a second addition function of adding a range of width ($SY_0$–$PY_0$) to an end of the image read by the read function, which end extends in an X-direction from the third corner, when $SY_0 > PY_0$; a third addition function of adding a range of width ($PX_1$–$SX_1$) to an end of the image read by the read function, which end extends in the Y-direction from the fourth corner, when $SX_1 < PX_1$; and a fourth addition function of adding a range of width ($PY_1$–$SY_1$) to an end of the image read by the read function, which end extends in the X-direction from the fourth corner, when $SY_1 < PY_1$.

In the scanner driver program, when the information processing apparatus stores a plurality of printer driver programs prepared correspondingly to a plurality of printers and for transmitting/receiving information to/from the printers, the scanner driver program allows the information processing apparatus to implement a selection function of selecting any one of the plurality of printer driver programs; and the acquisition function executes the selected printer driver program so as acquire a printable range belonging to a print paper size as large as the read paper size.

According to the scanner driver program, an image read by the scanner can be printed by a plurality of printers without the position and size (scale).

What is claimed is:

1. A non-transitory computer readable medium storing a program for configuring an information processing apparatus that transmits/receives information to/from a scanner and a plurality of printers so that the information processing apparatus performs as an image reading unit, a printer selection unit, and a layout unit, wherein:
   the image reading unit is configured to generate a scanned image from an original document via the scanner and select either a first image scanning operation or a second image scanning operation;
   the printer selection unit is configured to select a printer driver corresponding to a printer that performs a printing operation from the plurality of printers only when the second image scanning operation is selected, the first image scanning operation being performed based on a readable range of the scanner and the second image scanning operation being performed based on a printable range of the selected printer; and
   the layout unit is configured to calculate a print start point such that the read image is printed in a condition in which one end of the read image is identical to one end of a printable range of the selected printer that is selected by the printer selection unit and is selected from the plurality of printers to/from which the information processing apparatus transmits/receives information.

2. The non-transitory computer readable medium according to the claim 1, wherein the first image scanning operation that is performed based on a readable range of the scanner, and the second image scanning operation is performed based on a printable range of the selected printer.

3. The non-transitory computer readable medium according to the claim 1, wherein the image reading unit is configured to add a blank portion to an outer edge of the scanned image when the printable range of the selected printer is larger than the scanned image.

4. The non-transitory computer readable medium according to the claim 1, wherein the printable range is obtained from the printer driver that controls the selected printer.

5. The non-transitory computer readable medium according to the claim 4, wherein the printable range corresponds to a size of a print paper.

6. The non-transitory computer readable medium according to the claim 1, wherein the layout unit is configured to output the scanned image and the calculated print start point to the printer driver that controls the selected printer.

7. A non-transitory computer readable medium storing a program for configuring an information processing apparatus that transmits/receives information to/from a scanner and a plurality of printers so that the information processing apparatus performs as an image reading unit, a printer selection unit, and a read range determination unit, wherein:
   the image reading unit is configured to generate a scanned image from an original document via the scanner and select either a first image scanning operation or a second image scanning operation;
   the printer selection unit is configured to select a printer driver corresponding to a printer that performs a printing operation from the plurality of printers only when the second image scanning operation is selected, the first image scanning operation being performed based on a readable range of the scanner and the second scanning operation being performed based on a printable range of the selected printer; and the read range determination unit is configured to determine the read range based on the printable range of the selected printer that is selected by the printer selection unit and is selected from the plurality of printers to/from which the information processing apparatus transmits/receives information.

8. The non-transitory computer readable medium according to the claim 7, wherein the printable range corresponds to a size of a print paper.

9. The non-transitory computer readable medium according to the claim 7, wherein the image reading unit is configured to add a blank portion to an outer edge of the scanned image when the printable range of the selected printer is larger than the scanned image.

10. The non-transitory computer readable medium according to the claim 7, wherein the first image scanning operation is performed based on a readable range of the scanner and the second image scanning operation is performed based on a printable range of the selected printer.

11. The non-transitory computer readable medium according to the claim 7, wherein the printable range is obtained from the printer driver that controls the selected printer.

12. The non-transitory computer readable medium according to the claim 7, wherein the information processing apparatus further comprises a layout unit that is configured to output the scanned image and a calculated print start point to the printer driver that controls the selected printer.

* * * * *